UNITED STATES PATENT OFFICE 2,520,630

BETA-KETO ACIDS OF THE CHOLENIC ACID SERIES

Nicholas Thomas Farinacci, New York, N. Y.

No Drawing. Application August 6, 1947,
Serial No. 766,902

8 Claims. (Cl. 260—397.1)

This invention relates to beta keto derivatives of the cholenic acid series compounds and a method of producing the same.

The process for the manufacture of the 3-substituted 5,6 unsaturated cholenic acids is described in the art, for example, Fernholz: Liebig's Ann. der Chem., 507: 128 (1933) describes a process which consists in bringing the esterified 5,6 halogenated stigmasterol into reaction with an oxidant for the 22–23 double bond to form the corresponding bisnorcholenic acid.

According to the invention these steroid derivatives having a side chain carboxyl, are treated with such substances which serve to substitute for the alpha hydrogen and thus form beta keto esters, the free acids of which are decarboxylated.

The reaction may for example, be illustrated in detail by the following scheme for the formation of beta keto bisnorcholenic acid esters

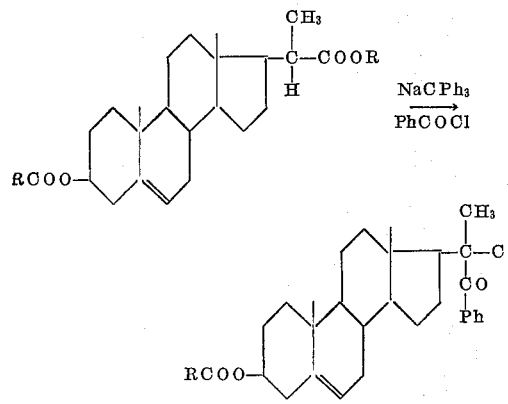

The following examples illustrate the invention:

Example 1

65 grams of 3-acetoxy bisnorcholenic acid ethyl ester are treated with the sodium triphenylmethane which is prepared by treating 63 grams of triphenylmethyl chloride with 2100 gms. of 1 percent sodium amalgam dissolved in 1500 grams of dry ethyl ether. This reaction mixture is treated with 22 grams of benzoyl chloride dissolved in 50 grams of ethyl ether for 3 hours. The ether is distilled off to reduce the volume to 400 gms. and the residue is shaken with 300 gms. of 0.6 percent acetic acid in water. The ether solution is treated with anhydrous calcium sulfate, the ether is evaporated off and after cooling the residue the triphenylmethane is filtered off. The beta keto ester is crystallized from toluene.

Example 2

65 grams of 3-acetoxy bisnorcholenic acid ethyl ester are treated according to Example 1 with 30 grams of benzoyl benzoate. There is thus obtained the same beta phenyl ketone of the 3-acetoxy bisnorcholenic acid ethyl ester.

Instead of benzoyl chloride and benzoate also other agents can be employed to form the beta keto esters as, for example, benzoyl phenoxide and the ethoxide and for example 3-acetoxy 5,6 bisnorcholenic acid chloride.

Also the reaction is not limited to the acid esters of bisnorcholenic derivatives. Thus in addition, for example, the etiocholenic, norcholenic, and cholenic acid esters can be formed into beta keto esters according to this process.

The reaction can be carried out by customary methods as is known for enolizations: thus, the process can be conducted in the presence of appropriate solvents, catalysts and the like.

Of course, many changes and variations in the reaction conditions, the agents used and the like may be employed by those skilled in the art in accordance with the principles set forth herein and in the claims annexed hereto.

The acids of the "cholenic acid series" is defined to include the saturated and unsaturated acids e. g. bisnorcholenic, etiocholenic, norcholenic and cholenic acids, which may have groups in the 3 positions and addends for example halogens on the double bonds in rings A and B of the perhydrocyclopentanophenanthrene nucleus.

The term "steroid residue" indicates the perhydrocyclopentanophenanthrene nucleus which may have substituents and unsaturated bonds in the nucleus and also portions of the side chain in the 17 position.

I claim:

1. Process for the manufacture of beta-keto esters of the cholenic acid series wherein the esters of the series are treated with alkali triphenylmethyl and the resulting enolate is treated with an acyl halide.

2. Process as in claim 1, wherein the enolate is treated with an acid anhydride.

3. Process as in claim 1, wherein the enolate is treated with an acid ester.

4. Process as in claim 1, in which the starting material comprises a 3-acylated compound of the cholenic acid series.

5. Process as in claim 1, wherein the enolate is treated with benzoyl chloride.

6. Process as in claim 2, wherein the enolate is treated with benzoyl benzoate.

7. Process as in claim 3, wherein the enolate is treated with phenyl benzoate.

8. Process for the manufacture of 3-acetoxy 20-benzoylated bisnorcholenic ethyl ester, wherein the 3-acetoxy bisnorcholenic ethyl ester is treated with sodium triphenylmethyl and treating the 20 enolate with benzoyl chloride.

NICHOLAS THOMAS FARINACCI.

REFERENCES CITED

The following references are of record in the file of this patent:

UNITED STATES PATENTS

| Number | Name | Date |
|---|---|---|
| 2,296,572 | Reichstein | Sept. 22, 1942 |